Figure 1:
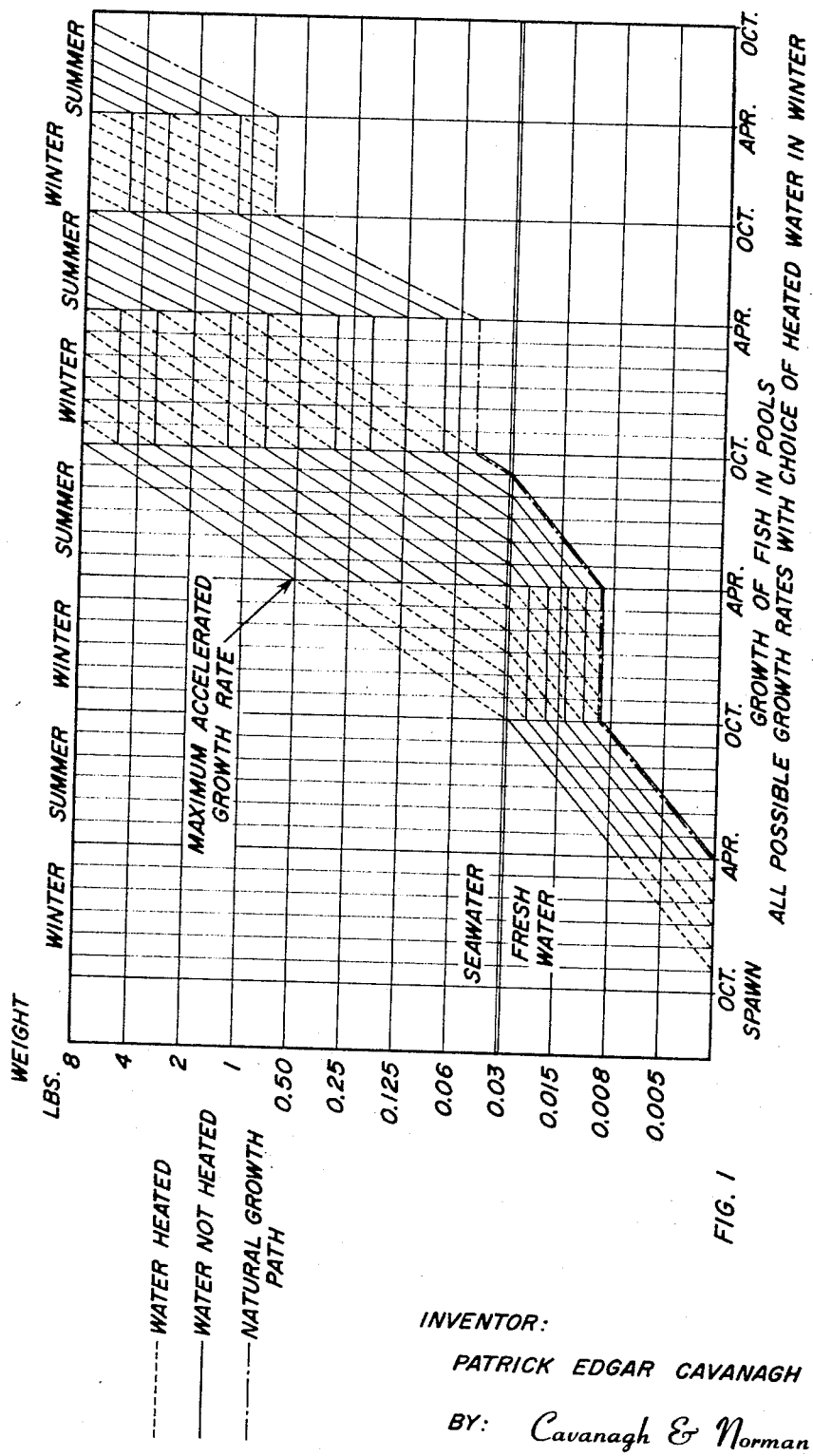

INVENTOR:
PATRICK EDGAR CAVANAGH
BY: Cavanagh & Norman

United States Patent Office 3,446,185
Patented May 27, 1969

3,446,185
METHOD OF RAISING FISH
Patrick Edgar Cavanagh, Westmount, Montreal, Quebec, Canada, assignor to Premium Iron Ores Limited
Filed Mar. 14, 1966, Ser. No. 533,920
The portion of the term of the patent subsequent to May 27, 1985, has been disclaimed
Int. Cl. A01k *61/00*
U.S. Cl. 119—3                                6 Claims This invention relates to a method of providing a uniform supply of marketable fish and to a method of controlling the growth rate thereof.

The raising of marketable fish in tanks on a commercial scale under certain controlled conditions is a well established art. Such techniques of raising fish have been practiced in North America and in Europe and many different types of rearing methods have been employed.

An important consideration in the rearing of fish for market use is found in the fact that the fish, to be fully marketable, must be delivered to market throughout the year in order that a fish raising operation can be commercially feasible. A further important consideration is the energy requirement necessary to maintain the rearing pools at optimum growing conditions, whether these optimum conditions be accelerated or retarded growth, and to the cost of the energy input per weight of fish reared.

The present invention provides a method by which certain types of fish, for example, Atlantic salmon, can be brought to a marketable weight within a specified period and the fish can be delivered at regular intervals, such as for instance, in monthly intervals, the fish produced being done so at a minimal expenditure of energy required for heating of the rearing pools during seasons of low temperature.

Rearing of fish such as for instance, Atlantic salmon, along the coasts of North America is complicated by seasonal variations in water temperatures of more than 20 degrees F. Selecting the average summer temperature of the local water as being the optimum growth rate temperature then in order to provide optimum growth rate during the winter months would require the heating of the rearing pools from 20 degrees F. beyond that normally encountered for that particular season. It will be appreciated that such an increase in water temperature for the considerably large amounts of water encountered in commercial rearing of fish would entail considerable cost and for this reason careful consideration must be given to the method by which the fish can be reared to marketable weight with regard to the energy inputs required during low temperature seasons.

This invention can be applied, for example, to produce an 8 pound marketable Atlantic salmon from fish which double in weight every three months in fresh water at 55 degrees F. and double in weight every six weeks in sea water at 55 degrees F. providing a suitable supply of feed is provided. In this instance, it will become evident from the description of this invention that the most profitable technique is to cause the eggs spawned in October to hatch under controlled conditions some time in November (rather than in April), and to raise all the fish in heated water during this first winter so that they reach a weight of 0.03 pound by the beginning of the next winter. Under natural conditions, this weight would not be reached until nearly one year later during the following summer. Selected numbers of these fish are then transferred each month to heated sea water pools for accelerated growth during the second winter. Natural growth during the following summer brings some of the fish to marketable weight of 8 pounds by the first of October, or 24 months after spawning. The growth of the rest of the fish can be slowed down by keeping them in sea water pools at natural sea water temperatures during the third winter with a predetermined number of fish each month being transferred to a heated sea water pool for final feeding before marketing.

The technique described is quite different from the normal development of such fish and success depends upon rapid growth in fresh water of a fish of the required size and stage of development to be ready to enter sea water one year after spawning instead of the natural rate of development which requires 18 months to two years for the fish to reach this stage.

Figure 2:
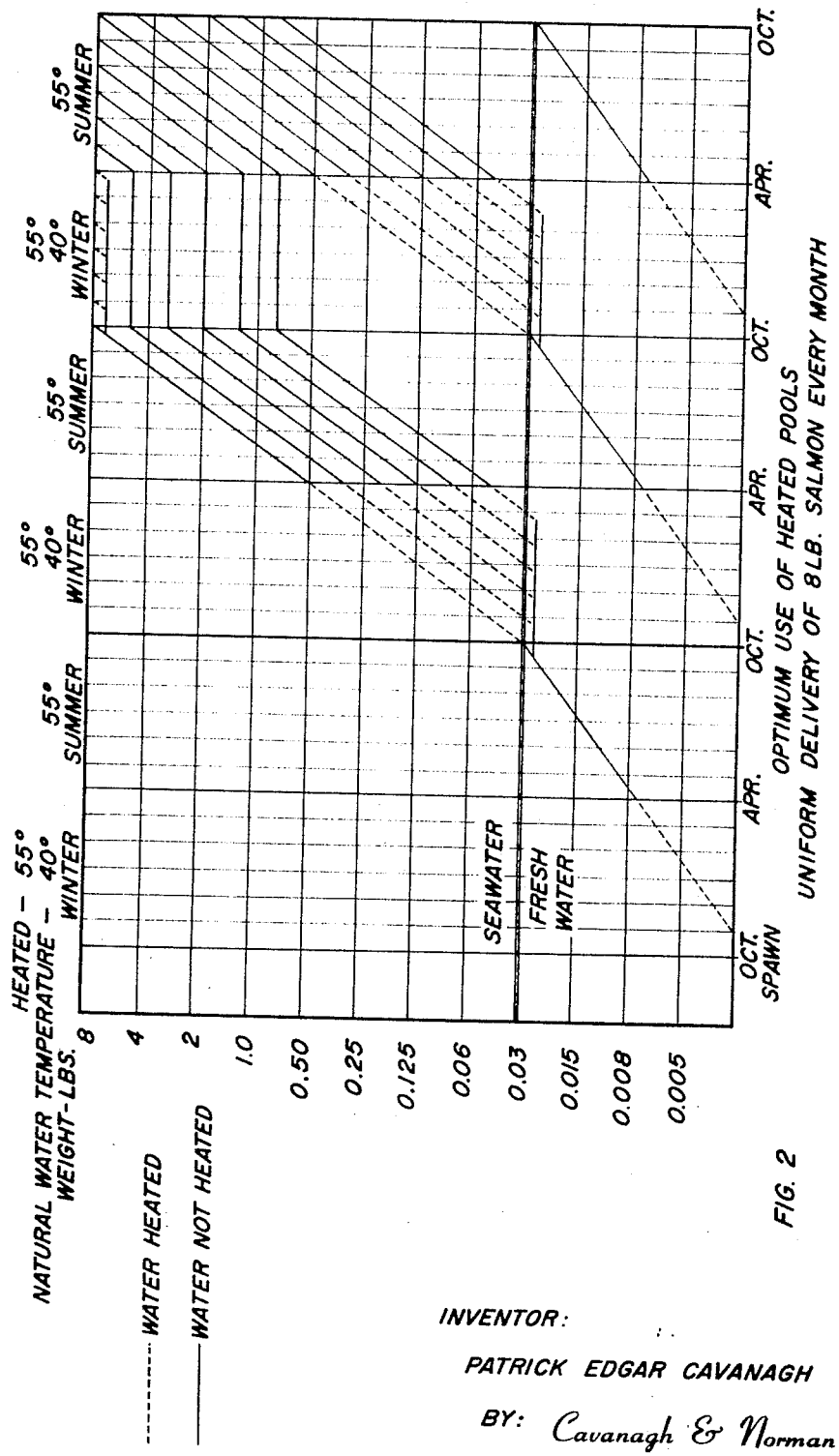

Other features of the invention will be apparent from the following description and accompanying drawings in which like numerals refer to like parts through the various views and diagrams, and in which, in the drawings:

FIGURE 1 is a diagrammatic view illustrating in composite form all possible paths of natural and accelerated growth for fish, which may be utilized through the various seasons leading up to a marketable weight; and FIGURE 2 is a diagram illustrating a preferred method of providing fish of uniform size and supply according to the present invention in a climate where the average summer water temperature for both fresh and sea water is 55 degrees and the average winter water temperature for both fresh and sea water is 40 degrees.

Referring to FIGURE 1 the chart or graph illustrates the possible paths by which fish may reach maturity in a climate where the temperature range varies considerably between seasons such as from winter to summer. Such variations may be encountered along the Atlantic coast of Canada and the chart is meant to illustrate possible growth paths for fish such as for instance, Atlantic salmon reared on the coast of Canada under normal and accelerated conditions.

In the chart the broken lines represent the growth of fish in accelerated conditions where the rearing tanks or pools are heated, and the solid lines represent the growth of the fish under natural conditions such as in the summertime when it is not necessary to heat the rearing pools.

Also included in the diagram of FIGURE 1 is the normal growth rate of such fish, this being represented by the dot-dash line wherein the fish grow at accelerated growth during the summer months and grow at retarded rates during the winter months. From this graph it can be seen that under the natural seasonal variations of temperature, it takes four years for this type of fish to reach the weight of 8 pounds. By comparison on the maximum accelerated growth rate path, as noted on the diagram, the fish will reach a weight of 8 pounds in only two years.

From comparison of the possible growth paths for fish, illustrated in FIGURE 1, it will be seen that certain optimum conditions may be selected in order that the fish can be raised to marketable weight with a minimal amount of energy input into heating the pools during the lower temperature season. By applying the information, as illustrated in FIGURE 1 the chart as shown in FIGURE 2 can be made.

Referring particularly to FIGURE 2 the graph shows the optimum growth paths for fish in order to bring units of marketable fish to predetermined weights and at predetermined intervals.

This graph illustrates the optimum growth technique for fish of a type which will double in weight in fresh water every three months at an average 55 degrees year round and will double in weight every six weeks in sea water at an optimum temperature year-round. To achieve this result, 12 units of fish are grown in fresh water to reach a weight of 0.03 pound in October, the year after they are spawned. Seven units are placed in heated sea water in October and a further unit in each of the following months for the succeeding five months. One year later, one unit of fish is at marketable weight while another six units are kept in unheated sea water pools to minimize growth and feeding. From this reserve of six units, a single unit is taken in each of the suceeding six months and given a final feeding in a heated sea water pool. The other five units, which have not been grown at such an accelerated rate, are also held in unheated sea water pools during the third winter and in the following summer, one unit of these fish will reach marketable weight of 8 pounds in each of the following five months. This cycle will be repeated with a new batch of fish spawned in the October following the spawning of the first batch.

From the chart of FIGURE 2 it will be seen that the accelerated growth rate, that is the heating of the rearing tanks, is carried out when the fish are comparatively small that is up to the smolt stage. Since a major portion of the accelerated growth rate occurs at this time, it will be seen that the fish, being of comparatively small size, can be contained in smaller quantites of water during the accelerated growth rate, whereby a saving is effected in the required amount of heat input into the rearing tanks. Since the volume of water required for rearing fish is directly related to the weight of fish within the volume of water, then a larger number of fish, being in the smaller smolt stage can be accommodated in the given size of rearing tank. Thus, while the method according to the present invention provides marketable fish in discrete quantities and continuously on a year to year basis, the amount of heat required to attain accelerated growth is kept to a low figure, thereby to reduce the total cost of the fish produced.

A further advantage to be gained in rearing fish according to the method as outlined in FIGURE 2 is found in the fact that the total cost of installation of the rearing equipment, such as tanks and heating equipment, is substantially reduced from what would otherwise be the case for rearing operations involving accelerated growth and heating of pool water to obtain a maximum growth rate for all fish at all times. It has been calculated that by utilizing the present method, as opposed to having all fish in heated water all winter, the capital expenditure can be reduced to approximately one-fifth and the total heating expenditure can be reduced to about one-twentieth of what would otherwise be required. Other possible combinations of natural or accelerated hatching, natural or accelerated growth in fresh water, and natural or accelerated growth in sea water in a temperature climate have been investigated and it has been found that the technique illustrated in FIGURE 2 gives a low cost in terms of capital investment and heating expense, as well as the vital factor in marketing fish in fresh or fresh frozen condition of providing a uniform number of fish of uniform weight throughout the year.

From the foregoing, it will be seen that the present invention provides a method of controlling the growth rate of fish whereby a continual supply of fish is obtained, these fish being supplied for a whole twelve month period and being brought up to acceptable market weight in approximately equal numbers each month. As shown in FIGURE 1, various paths are available in a temperate climate from which a growth path can be selected for providing fish of required marketable weight in quantities as required, by rearing in ponds. As has been previously stated, a set of optimum growth paths is shown in FIGURE 2, where a number of eggs are hatched to provide twelve units of fish, each unit corresponding to the number of fish required to reach marketable size in any one month. These fish are grown to the smolt stage at which they are ready to enter salt water and which is approximately 0.03 pound weight. At this point, the twelve units follow different paths. The first seven units are introduced for the winter into sea water tanks, heated to optimum temperature of about 55 degrees F. to provide accelerated growth. The remaining five units are held over for a period during the winter in unheated pools. At one month intervals, one unit of these five is transferred to a heated sea water pool to achieve accelerated growth to provide the remainder of the delivery of fish units during the last five months of the twelve month delivery schedule. The first seven units are near marketable weight at the beginning of the following winter. One unit is marketed and the other six units are held in unheated sea water pools at minimum growth and feeding rate. One unit is processed to marketable weight each month by transferring to a heated sea water pool for a short final feeding period.

This short final feeding period is a further advantage to the present invention in that the fish, which at this time are comparatively large, are fed in heated pools for a comparatively short period, whereby little heat energy is required as compared to the total weight of fish. In this manner, full advantage is taken of the present invention to reduce the total energy input for given weights of fish.

The method according to the invention involves the growing and processing of fish under controlled environmental conditions in order to effect favourable fish growth and production.

What I claim is:

1. A method of raising marketable fish in tanks from eggs spawned in the fall of the year to provide a predetermined monthly uniform delivery of fresh fish in the third year of growing by utilizing the variation in temperature from a low in the fall and winter seasons to a high in the spring and summer seasons, and comprising the steps of: hatching the eggs in the tanks to provide twelve equal units of fingerlings; accelerating the growth of all said units by supplying heat to the tanks during the first fall and winter seasons; providing a suitable supply of feed to the tanks, selecting seven of said units and accelerating the growth thereof during the second fall and winter seasons by supplying heat to the tanks; selecting the remaining five units, one each month of the second fall and winter seasons, and accelerating the growth thereof by supplying heat to the tanks, to provide five different growth paths; and selecting said seven units, one each month of the third fall and winter seasons, and accelerating the growth thereof by supplying heat to the tanks, to provide seven different growth paths, the seven growth paths providing marketable fish for the first seven months of the third year of raising, and the five growth paths providing marketable fish for the remaining five months of the third year.

2. A method of raising marketable fish as claimed in claim 1, wherein the heat supplied to the tanks during the fall and winter months is sufficient to maintain the tanks at a temperature between 50 degrees and 70 degrees F.

3. A method of raising marketable fish as claimed in claim 1, wherein the fish belong to the genus salmo.

4. A method of raising marketable fish as claimed in claim 3, including the step of transferring the fish from fresh water to salt water at the smolt stage.

5. A method of raising marketable fish as claimed in claim 1, wherein the fall and winter temperature in the unheated tanks is less than 40 degrees F.

6. A method of raising marketable fish in tanks from eggs spawned in the fall of the year to provide a predetermined monthly uniform delivery of fresh fish, starting twenty-four months later, by utilizing selective heating of water in the wintertime for a predetermined number of the fish and comprising the steps of: accelerating the growth of all such units of fish by supplying heat to the fresh water pools during the first fall and winter seasons; providing a suitable supply of feed to the pools, selecting seven of said units of fish and transferring them to sea water pools in the spring and accelerating the growth thereof during the second following winter season by supplying heat to the sea water pools; selecting the remaining five units, one each month of the second winter season and transferring this unit to sea water and accelerating the growth thereof by supplying heat to the pools, to provide five different growth rates; selecting one of said first seven units, each month of the third following winter season and accelerating the growth thereof by supplying heat to the pools, to provide seven different growth paths, the seven growth paths providing marketable fish for the first seven months of the third year of raising and the five subsequent growth paths providing marketable fish for the remaining five months of the third year.

No references cited.

HUGH R. CHAMBLEE, *Primary Examiner.*